US008838751B1

(12) United States Patent
Scofield et al.

(10) Patent No.: US 8,838,751 B1
(45) Date of Patent: Sep. 16, 2014

(54) BROKERING REAL TIME SERVICE PROVIDERS

(75) Inventors: Christopher L. Scofield, Seattle, WA (US); Luan K. Nguyen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 717 days.

(21) Appl. No.: 12/330,186

(22) Filed: Dec. 8, 2008

(51) Int. Cl.
*G06F 15/16* (2006.01)
*G06F 15/177* (2006.01)
*H04W 24/00* (2009.01)
*H04W 4/02* (2009.01)
*G01S 5/00* (2006.01)

(52) U.S. Cl.
CPC .............. *H04W 4/028* (2013.01); *G01S 5/0027* (2013.01); *H04W 4/02* (2013.01)
USPC ........ 709/220; 709/203; 709/229; 455/456.1; 455/456.3

(58) Field of Classification Search
CPC ............................. H04W 4/028; G01S 5/0027
USPC ....................................................... 709/220
See application file for complete search history.

(56) References Cited

U.S. PATENT DOCUMENTS

| 5,944,793 | A | * | 8/1999 | Islam et al. ................... 709/220 |
| 6,091,959 | A | * | 7/2000 | Souissi et al. ................ 340/7.46 |
| 6,205,477 | B1 | * | 3/2001 | Johnson et al. ............... 709/220 |
| 6,393,412 | B1 | * | 5/2002 | Deep ............................. 705/400 |
| 7,353,253 | B1 | * | 4/2008 | Zhao ............................. 709/204 |
| 7,580,862 | B1 | * | 8/2009 | Montelo et al. .............. 705/26.1 |
| 2001/0047407 | A1 | * | 11/2001 | Moore et al. .................. 709/223 |
| 2002/0057283 | A1 | * | 5/2002 | Biswas et al. ................. 345/700 |
| 2002/0095323 | A1 | * | 7/2002 | Combs et al. ..................... 705/8 |
| 2002/0133571 | A1 | * | 9/2002 | Jacob et al. ................... 709/219 |
| 2005/0227676 | A1 | * | 10/2005 | DeVries .................... 455/414.1 |
| 2007/0083639 | A1 | * | 4/2007 | Gilbert et al. ................. 709/224 |
| 2009/0112623 | A1 | * | 4/2009 | Schoenberg ..................... 705/2 |

* cited by examiner

*Primary Examiner* — Rupal Dharia
*Assistant Examiner* — Joe Chacko
(74) *Attorney, Agent, or Firm* — Thomas Horstemeyer, LLP

(57) ABSTRACT

Disclosed are various systems, methods, and other embodiments involving the brokering of real time services for users. To this end, location data is maintained in at least one server representing a current location of each one of a plurality of service providers. A subset of the service providers is identified in the at least one server that are located within a predefined response time relative to a location of a user in response to a request for a service from the user. A listing of the subset of the service providers is sent from the at least one server to a client contemporaneously with a receipt of the request for the service to facilitate a selection of one of the service providers to render the service.

22 Claims, 10 Drawing Sheets

Welcome to ExpertsNow!

Please identify the type of expert you are looking for by entering a description. Alternatively, you may search through our expertise catalog to find an applicable subject.

[ Computer Crash ] — 203          [ Browse ] — 206

As a default, your location is obtained from your device. Alternatively, you can specify a location below.

[                                     ] — 209

Enter address, postal code, intersection, *etc*.

As a default, potential experts within the below radius around your location will be identified to help you or you may specify a different radius below.

Find experts that can respond within [ 5 ] minutes.
— 213

Welcome to ExpertsNow!

Please select one of the experts listed below who is ready to help you right now!

○  John Doe
   Certified in PC repair and Instruction

Response Time: 4 Minutes
   Rating: ☆☆☆☆☆    7 Comments ⟵219

○  Susan Shoe
   Certified in PC instruction

Response Time: 10 Minutes
   Rating: ☆☆☆☆☆    5 Comments

○  Laslo Razoul
   Certified in PC repair

Response Time: 7 Minutes
   Rating: ☆☆☆    12 Comments

ExpertsNow!

You have been selected to help the following customer:

Sarah Jacobs  
The Cup is Half Full Coffee Shop ← 107  
123 Peachtree Street  
Atlanta, Georgia 12345

Contact Information: ← 233  
   Cell: (123) 456-7891  
   Email: sarah@emailaddress.com Please indicate whether you are able to render your services in the above matter by selecting the appropriate button below. 236

| I accept this engagement and shall proceed immediately |

| I am unable to render this service at this time |

239

Note the following products and offers you may suggest:

Crash! and Recovery ← 243  
By John Fixit  
Special Offer: $5.35 (20% discount)

BROKERING REAL TIME SERVICE PROVIDERS

BACKGROUND

Sometimes people need help with tasks at unpredictable times during the day. For example, a student might be working on homework at a given time during the day and may become confused with respect to a problem presented and would like to solicit the help of someone such as a tutor who understands the subject matter. Unfortunately, it is often the case that appointments need to be made to procure help, thereby making the student wait until such time as the tutor is scheduled to meet with the student. Consequently, persons needing help with various tasks may be delayed until formal scheduled times.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a drawing of one example of a first user interface generated on a user client in the data communications network of FIG. 1 according to an embodiment of the present disclosure.

FIG. 3 is a drawing of one example of a second user interface generated on a user client in the data communications network of FIG. 1 according to an embodiment of the present disclosure.

FIG. 4 is a drawing of one example of a user interface generated on a service provider client in the data communications network of FIG. 1 according to an embodiment of the present disclosure.

DETAILED DESCRIPTION

Figure 1:
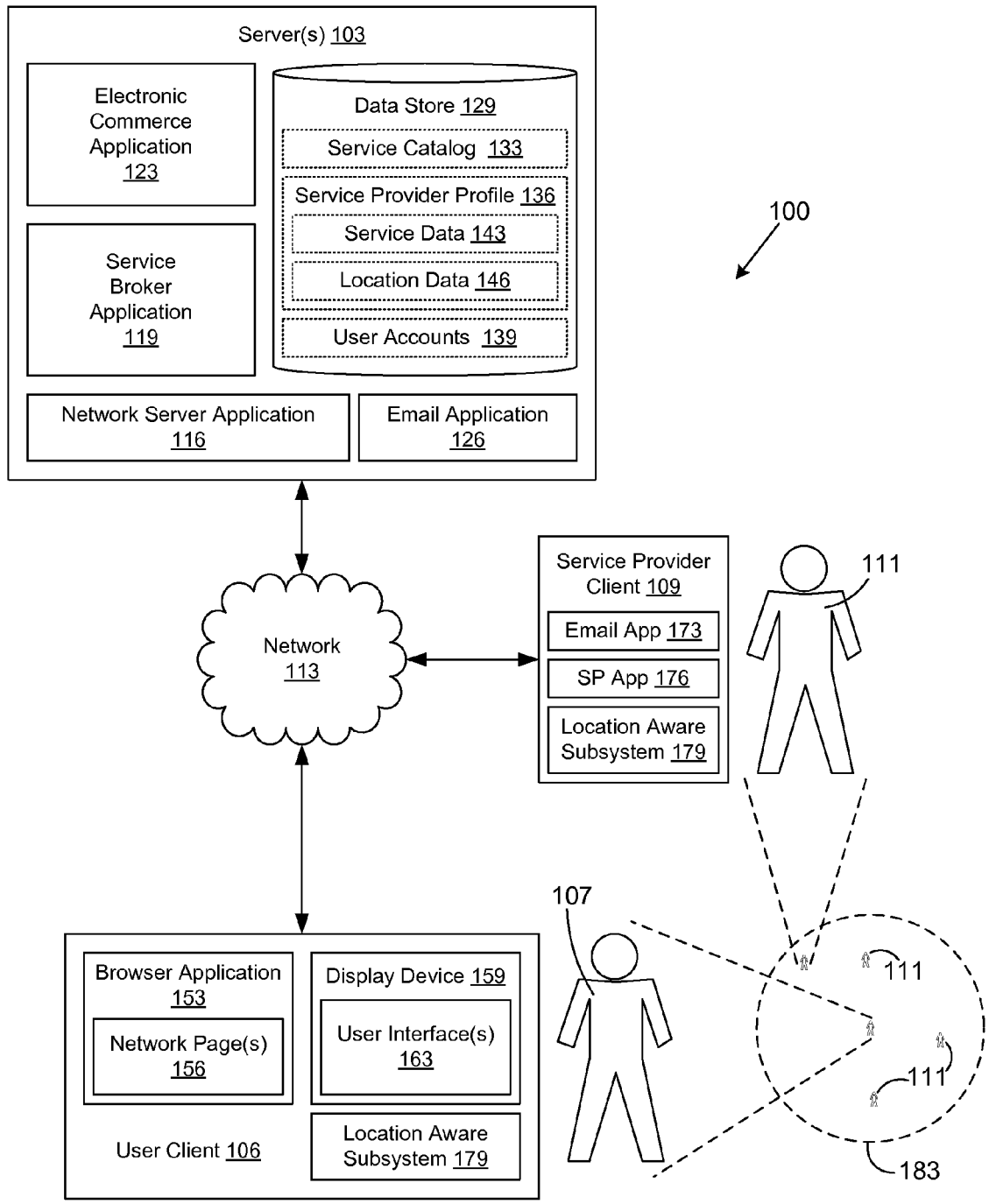
FIG. 1 is a drawing of a data communications network according to an embodiment of the present disclosure.

With reference to FIG. 1, shown is a networked environment 100 that includes one or more servers 103 and one or more user clients 106, and one or more service provider clients 109 which are coupled to a network 113. As will be described, the various components in the networked environment 100 are employed to facilitate the rendering of a service by a service provider to a user contemporaneously with the request by the user for the service. First, a general discussion of the components in the networked environment 100 is provided, followed by a discussion of the operation of the same.

The server 103 may comprise a bank of servers or servers operating in some other arrangement as can be appreciated. The user client 106 and the service provider client 109 are each representative of what may be many different user clients 106 and service provider clients 109 that can communicate with the server 103 over the network 113. Each user client 106 is associated with one or more users 107, and each service provider client 109 is associated with one or more service providers 111. The user client 106 and the service provider client 109 may each comprise, for example, a computer system or other like system that may be embodied in a desktop computer, laptop computer, personal digital assistant, cellular telephone, and other devices. Although the server 103 may be referred to herein in the singular, it is understood that the same may be representative of multiple servers 103.

The network 113 may comprise, for example, the Internet, intranets, wide area networks (WANs), local area networks, wireless networks, cable television networks, satellite networks or other suitable networks, etc., or any combination of two or more such networks. The various systems depicted herein may communicate with one another over the network 113.

The server 103 is employed to execute various applications such as, for example, a network server application 116, a service broker application 119, an electronic commerce application 123, an electronic mail ("email") application 126, and/or other applications. According to one embodiment, the service broker application 119 accesses data stored in a data store 129. Also, the electronic commerce application 123 accesses various data in data stores 129 and other locations accessible to the server 103.

The data stored in the data store 129 may include, for example, a service catalog 133, service provider profiles 136, user accounts 139, and other data. Each of the service provider profiles 136 includes, for example, service data 143 and location data 146. The service data 143 includes a listing of services associated with a respective service provider 111 as will be described. The service data 143 also includes a schedule that indicates the times a service provider 111 is available to render a service to a user 107. In addition, the service data 143 includes further information about the service provider 111 such as the mode of transportation that they employ and other data. The location data 146 includes data that indicates a current location of the respective service provider 111. In addition, there may be other data stored in the data store 129 for various other purposes not described in detail herein.

The network server application 116 facilitates communication with the user client 106 that is in data communication with the server 103 via the network 113. The network server application 116 is representative of various applications that facilitate access to the service broker application 119, the electronic commerce application 123, and other applications by the clients 106 and 109. To this end, the network server application 116 may comprise, for example, a web server application or other appropriate application as can be appreciated. Where the network server application 116 is a web server application, then the network server application 116 may facilitate browser access to the functionality of the service broker application 119, the electronic commerce application 123, and other applications as can be appreciated. Thus, the network server application 116 is an example of a server application that acts as a portal through which clients 106, 109 send requests that are processed by the service broker application 119, the electronic commerce application 123, and other applications. The responses to the client requests generated by the service broker application 119, the electronic commerce application 123, or other applications are received by the clients 106, 109 through the network server application 116 as can be appreciated.

According to one embodiment, the service broker application 119 facilitates brokering of services performed by service providers 111 for users 107 as will be described. To this end, the services performed by the service providers 111 are contemporaneous to the requests for such services from users 107 as will be described. The service broker application 119 tracks the location of the service providers 111 so that it can identify service providers 111 that can respond to a request for a service from a user 107.

The electronic commerce application 123 is executed in order to facilitate the online purchase of products over the network 113. The electronic commerce application 123 also performs various backend functions associated with the online presence of a merchant in order to facilitate the online purchase of products as will be described. For example, the electronic commerce application 123 generates network pages 156 such as web pages or other types of network content that are provided to clients 106, 109 for the purposes of selecting products for purchase, rental, download, lease or other form of consumption as will be described. The electronic commerce application 123 may also generate product recommendations based upon past sales histories of customers, customer profile data, and other information.

The network content that is supplied to clients 106, 109 by the electronic commerce application 123 is provided in response to requests received from clients 106, 109 in the server 103 during interaction between the service broker application 119, the electronic commerce application 123, or other applications, and respective clients 106, 109. This occurs, for example, as the clients 106, 109 navigate through various pages of a network site. The electronic commerce application 123 may be configured to dynamically generate such network pages 156 using information in a data store 129 or information obtained from other locations as can be appreciated.

Each of the user clients 106 includes a browser application 153 or other like application that facilitates the interaction with the network server application 116 on the server 103 and renders network pages 156 received from the service broker application 119, the electronic commerce application 123, and other applications through the network server application 116. The network pages 156 may be rendered, for example, on a display device 159 associated with the user client 106. When the network pages 156 are rendered on the display device 159, various user interfaces 163 may be rendered on the display device 159 to be manipulated by users 107 as will be described.

Each of the service provider clients 109 includes various applications such as, for example, an email application 173, a service provider application 176, and other applications as can be appreciated. The email application 173 and service provider application 176 facilitate interaction with the various applications on the servers 103 as will be described.

The service provider application 176 is downloaded from the server 103 and installed in the service provider client 109 in order to facilitate communication between the service provider client 109 and the service broker application 119. To this end, the service provider application 176 is configured to communicate a geographical location of the service provider client 109 to the service broker application 119 so as to allow the service broker application 119 to maintain the current location of the service provider client 109 as the location data 146 that is associated with a respective service provider 111. To this end, the service provider client 109 is location aware as will be described.

In addition, according to one embodiment, both the user client 106 and the service provider client 109 are "location aware" in that they include a location aware subsystem 179 that is configured to determine the physical location of the respective device. To this end, the location aware subsystem 179 is one that includes the components necessary to determine its current geographical location. Such components may comprise, for example, a global positioning system (GPS), or other systems that may be able to ascertain their geographical location based on signals from cellular towers or other signals as can be appreciated.

Next, the general operation of the networked environment 100 is described according to various embodiments. The description provided below is expressed in the form of one example scenario that illustrates the interaction between a user 107 and the service provider 111 as brokered by the service broker application 119. To begin, assume a user 107 finds he/she is in need of a particular service. For example, assume that the user 107 is shopping for clothing and he/she determines that he/she is in need of advice on fashion. The user 107 may be located, for example, in a shopping mall which has many different clothing outlets and other stores. To this end, assume that the user 107 carries the user client 106 that includes the browser application 153 and other applications as described above.

The user 107 may wish to solicit advice, for example, for the purchase of clothing from someone who is more knowledgeable in the area of fashion. For example, if the user 107 is not very fashion conscious, they may wish to have advice to ensure that they do not commit any fashion faux pas in their selection of items to purchase. In order to obtain the help of a service provider 111 who can assist in providing the needed advice, the user 107 may manipulate the browser application 153 to access a network site set forth by the service broker application 119 through the network server application 116. The network site may comprise multiple different network pages 156 that are linked together as can be appreciated.

By navigating through and manipulating one or more various network pages 156, the user 107 may ultimately generate a request for a service provider 111 to provide the service of fashion consulting, for example, at the location of the user 107. It is understood that the service might involve many other fields of endeavor such as assistance with computers, guides, tutoring in various subjects, and virtually any other service. By virtue of the fact that the user client 106 is location aware, the network pages 156 may include functional components that interact with the user client 106 to identify its precise geographical location at the time a request is generated for the service to be rendered by a respective service provider 111. When the request is sent to the service broker application 119 through the network server application 116, the service broker application 119 is thus informed of the geographical location of the user client 106 that is presumably carried by the user 107. Alternatively, the network pages 156 may facilitate the entry of the geographical location of the user 107 through appropriate user interface components as will be described.

Once the service broker application 119 has received the request for the services to be rendered by a service provider 111, the service broker application 119 searches for an appropriate service provider 111 to perform the service by examining the service provider profiles 136 in the data store 129. In particular, the service broker application 119 identifies those service providers 111 that are qualified for or have been identified as being capable of rendering the desired service to the user 107. To this end, the service broker application 119 may examine the service data 143 associated with the respective service providers 111 indicated in the service provider profiles 136 to determine whether given service providers 111 are identified as being qualified to render the respective service desired by the user 107.

Thereafter, the service broker application 119 generates a network page 156 that is transmitted back to the user client 106 that includes a list of a subset of the service providers 111 maintained in the data store 129. The subset of the service providers 111 in the list are those service providers 111 that are within a predefined response time 183 relative to the location of the user 107. Once again the predefined response time 183 comprises a period of time within which a service provider 111 should be able to respond to a request and provide the requested service. The response time 183 may involve determining how long it will take a given service provider 111 to meet with the user 107. This determination takes into account the distance between the respective service provider 111 and user 107 as well as the mode of transportation employed by the service provider 111. For example, a service provider 111 that is 5 miles away but travels by automobile may be able to respond in a shorter time than a service provider that is 0.5 miles away, but travels on foot.

Also, the determination may take into account the nature of the routes between the service provider 111 and the user 107. For example, such a route may involve multiple traffic lights that would slow the progress of the service provider 111 in getting to the user 107. Taking such factors into account, the service broker application 119 generates a list of the subset of the service providers 111 that can timely respond to the request by the user 107. A timely response may be, for example, one in which the service provider 111 is able to meet with the user 107 within a predefined response time 183 threshold or whether the service provider 111 meets other criteria.

Once the service broker application 119 has generated the list of the subset of service providers 111 that are within the predefined response time 183 relative to the user 107, then the service broker application 119 sends the list of the subset of the service providers 111 to the user client 106 contemporaneously with the receipt of the request for the service to facilitate the selection of one of the service providers 111 to render the service. The listing is sent contemporaneously with the request to the extent that the listing is sent substantially immediately in response to the request. The response is substantially immediate to the extent it involves the time necessary to dynamically lookup the service providers 111 and generate a network page 156 in response.

The determination of the service providers 111 that are available to perform the service requested is made in real time based upon the various factors described above such as distance from the user 107, mode of transportation, nature of the route to the user 107, and other factors. This is because such service providers 111 can provide immediate assistance assuming that they can timely respond contemporaneously to the user 107 requesting the service. Thus, as contemplated herein, the term "contemporaneously" refers to events or actions that occur or happen during the same period of time, where the period of time is relatively short such that the service providers 111 can ultimately provide the services to the users 107 on an on-demand basis. To this end, the generation of the list of service providers 111 is contemporaneous with the request when the ultimate locations of the service providers 111 are relevant such that they can timely respond to the user 107 requesting the service. If the list is constructed too long after the request, the location of the user 107 may have changed, thereby making the list of service providers 111 less relevant to the extent that such service providers 111 are able to render a service on-demand.

Once the user 107 receives the list of the subset of service providers 111 that are within the respond time 183 relative to the user 107, then the user 107 may select a respective one of the service providers 111 to render the desired service. In response, the user client 106 sends a message to the service broker application 119 indicating the service provider 111 that the user 107 wishes to use for the service. Thereafter, the service broker application 119 sends a directive to the service provider client 109 associated with the selected one of the service providers 111 that directs the service provider 111 to render the service to the user 107 in response to a receipt of the selection of the service provider 111 to render the service. This directive may be in the form of a message to the service provider client 109 of the respective selected service provider 111 to inform the service provider 111 that they have been requested to render the service to the user 107.

The message may be, for example, in the form of an email sent from the email application 126 to the email application 173 on the service provider client 109. Alternatively, some other messaging format may be employed. In one embodiment, the email application 173 presents the message to the service provider 111 so as to facilitate the use of active components that allow the service provider 111 to indicate whether they are willing to take on the assignment of performing the service for the respective user 107. To this end, the active components included in the email message, for example, may include pushbuttons or other components that may be manipulated to indicate whether the service provider 111 is willing to take on the assignment.

The service provider 111 can then manipulate the various components presented by the email application 173 to indicate whether they are willing to accept the assignment to perform the service for the respective user 107. Assuming they are so willing, the service provider client 109 transmits a positive response to the service broker application 119 indicating that the service provider 111 has accepted the assignment.

Alternatively, the service provider 111 may indicate that they do not accept the assignment to perform the service to the user 107. Accordingly, the service provider 111 may manipulate the appropriate components of the email presented by the email application 173 to transmit a negative response to the service broker application 119 indicating that the service provider 111 is unable or unwilling to accept the assignment. In such case, the service broker application 119 may send a second message to the user client 106 to facilitate a selection by the user 107 of an alternate service provider 111 to render the service to the user 107.

Assuming that the service provider 111 has agreed to accept the assignment of rendering the service to the user 107, then the service provider 111 proceeds to the location of the user 107 to meet the user 107 to perform the requested service. In the example described above, a service provider 111 may proceed to the store where the user 107 is located to provide immediate assistance in selecting articles of clothing to be purchased.

Thus, the service broker application 119 provides one advantage in that service providers 111 are obtained to perform services in real time on demand for users 107 that request such services without pre-scheduling. According to one embodiment, the location aware nature of the user client 106 and the service provider client 109 facilitates the provision of such services.

In addition, the service catalog 133 maintained in the data store 129 comprises a catalog of all the various services that can be rendered by the respective service providers 111. In this respect, service providers 111 are associated with one or more of the services listed in the service catalog 133. This association may be accomplished by virtue of the service data 143 associated with the respective service provider profiles 136.

Each service provider profile 136 is associated with a respective one of the service providers 111. In addition, the service broker application 119 periodically updates the current location of each of the service providers 111 by communicating with the service provider applications 176 in the respective service provider clients 109 of the service providers 111.

When a new service provider 111 is established with the service broker application 119, various network pages 156 may be presented by the service provider client 109 that allow the service provider 111 to enter appropriate data for their respective service provider profile 136. When establishing the new service provider 111 to provide various services, a copy of the service provider application 176 is transmitted from the server 103 to the service provider client 109 and is installed on the service provider client 109. As mentioned above, the service provider application 176 facilitates interaction between the service provider client 109 and the service broker application 119 on the server 103 to inform the server 103 of the location of the service provider client 109, thereby providing the current location of the service provider 111.

In addition, when a directive is transmitted to a respective service provider client 109 by the service broker application 119 to determine whether the service provider 111 can perform the respective service requested, the service broker application 119 may also include one or more product offerings with the directive that may be presented by the service provider 111 to the user 107. The product offering may be generated via interaction between the service broker application 119 and the electronic commerce application 123. Specifically, the service broker application 119 may inform the electronic commerce application 123 of the subject matter pertaining to the service to be performed. In response to this information, the electronic commerce application 123 provides recommendations for products in the form of product offerings to be presented to the service provider 111 in association with the service to be rendered.

The service provider 111 may then present the product offerings to the user 107 while performing the service. Given that the service provider 111 is considered an "expert" on the subject matter, it is possible that the user 107 will give greater weight to their opinion as to the products offered for purchase. Consequently, the user 107 may be more likely to make the purchase of the product.

For example, in the case where the user 107 wishes to solicit fashion advice, the service provider 111 may receive product offerings such as books about fashion that they may communicate to the user 107 and suggest that they purchase in order to help make fashion decisions in the future. Accordingly, in such a scenario, the service provider 111 acts as an agent for the merchant that sells its wares via the electronic commerce application 123.

In addition, in a similar manner, the service broker application 119 may request recommendations in the form of product offerings from the electronic commerce application 123 to include in the network pages 156 served up to the user client 106.

Referring next to FIG. 2, shown is an example of a user interface 163a generated on the user client 106 (FIG. 1) that facilitates the specification of a type of service by the user 107 (FIG. 1) for which the user 107 wishes to engage a service provider 111 (FIG. 1). The user interface 163a includes a service type field 203. Associated with the service type field 203 is a browse button 206. Also, the user interface 163a includes a location specification field 209. Further, the user interface 163a includes a response time limiter 213.

The service type field 203 and browse button 206 may be employed to enter a type of service sought by a user 107. A user 107 may click on the browse button 206 to implement functionality associated with a respective network page 156 (FIG. 1) to communicate with the service broker application 119 (FIG. 1) to obtain a listing of the various services offered through the service broker application 119 so that a user 107 may make a selection. The specific network pages 156 that generate user interfaces 163 that provide such a listing of the various services offered are not described herein in detail. In one embodiment, such services may be listed using a tree structure or other approach to organizing the services, etc.

In addition, the location specification field 209 may be employed to indicate a geographical location of a user 107 at a given time. In one embodiment, assuming that the user client 106 is location aware as described above, then the location specification field 209 may be left blank where the location of the location aware user client 106 is obtained to indicate the location of the user 107 as a default. Alternatively, if the user 107 is in transit to a given location, but has not yet arrived, the user 107 may specify their destination as a geographical location in the location specification field 209 so that the search for service providers 111 will center on the proper location to find service providers 111. In this manner, service providers 111 will be located that are within the predefined response time 183 (FIG. 1) most closely associated with where the user 107 will be at the time the service is to be rendered.

In addition, the users 107 may specify a response time limiter 213 when relevant. For example, if the user 107 wishes to specify a response time 183 within which a service provider 111 must meet with the user 107, such response time 183 may be specified via the response time limiter 213. In one embodiment, a default response time 183 is assumed for the user 107.

Alternatively, the response time limiter 213 may be used to define the desired response time 183 relative to the location specification field 209 such as a postal code area, municipal boundary, private property premises, cells of a cellular network, or other area as can be appreciated. In addition, the service broker application 119 may include a listing of predefined response times 183 that are used as defaults based upon the location of the user client 106 so as to search for service providers 111 based on a request for a service by the user 107.

With reference to FIG. 3, shown is another example of a user interface 163b according to various embodiments of the present disclosure. A user interface 163b includes a listing of service providers 111. A toggle selector 216 is associated with each service provider 111. The user interface 163b is generated, for example, based upon a network page 156 (FIG. 1) that is received by the user client 106 (FIG. 1) from the service broker application 119 (FIG. 1). The user interface 163b includes the listing of service providers 111 as described above to facilitate a selection of a respective one of the service providers 111 by the user 107 (FIG. 1) as described above.

To this end, the user 107 may click on a respective one of the toggle selectors 216 associated with the respective service providers 111 to select such service provider 111 to perform the desired service. The listing of the service providers 111 includes the response time 183 (FIG. 1) for each service provider 111. Also associated with each of the service providers 111 is a rating such as a star rating system or other rating system that indicates how effectively the service provider 111 has performed the service in the past.

The user interface 163b also provides for an ability to review comments about each service provider 111 received as feedback from prior users 107 who receive services from such service providers 111. To this end, associated with each service provider 111 is a comment link 219 that leads to further network pages 156 that set forth comments entered by users 107 who received services from such service providers 111 in the past. In addition, once a user 107 has clicked on or selected a respective one of the toggle selectors 216, the user 107 may click on the continue button 223 to send a message that includes the selection of the respective service provider 111 back to the service broker application 119.

With reference to FIG. 4, shown is a user interface 173a that may be transmitted by the email application 126 (FIG. 1) to the service provider client 109 and rendered on the service provider client 109 by the email application 173 as described above. Alternatively, the user interface 173a may be communicated to the service provider client 109 in some other manner.

As shown, the user interface 173a lists the user 107 that has requested a service. The user interface 173a essentially informs the service provider 111 (FIG. 1) that they have been selected by a user 107 to render a service. According to one embodiment, the service is to be rendered contemporaneously with the receipt of the email that includes the user interface 173a. To this end, the service provider 111 proceeds immediately to help the user 107 and render the service as described above. To this end, the user interface 173a discloses the name and location of the user 107 that has requested the service. Also, the contact information 233 of the user 107 may be included so that the service provider 111 can contact the user 107 if need be. Alternatively, the contact information 233 may comprise a broker contact such as a telephone number or email address, etc. Such contacts may be forwarded to the actual service provider 111 via call forwarding, email forwarding, or other mechanism to protect the privacy of the service provider 111.

Further, the user interface 173a includes an acceptance button 236 and a rejection button 239. The acceptance button 236 may be clicked on or otherwise pressed by the service provider 111 to indicate that they accept the assignment of performing the service for the user 107. The rejection button 239 is clicked on or otherwise pressed by the service provider 111 so that the service provider 111 can inform the service broker application 119 that they cannot perform the service requested. In such case, the service broker application 119 may take such steps as needed to find a second service provider 111 for the user 107.

In addition, the user interface 173a may include product recommendations in the form of product offerings 243 that list products related to the service to be performed. As described above, the service provider 111 may act as an agent on behalf of the merchant that operates the electronic commerce application 123 by presenting the product offerings 243 to the user 107 to encourage purchase thereof. According to one embodiment, it may be the case that the respective service provider 111 is paid a commission or other fee for any purchases made based upon such product offerings 243 as can be appreciated.

Figure 5:
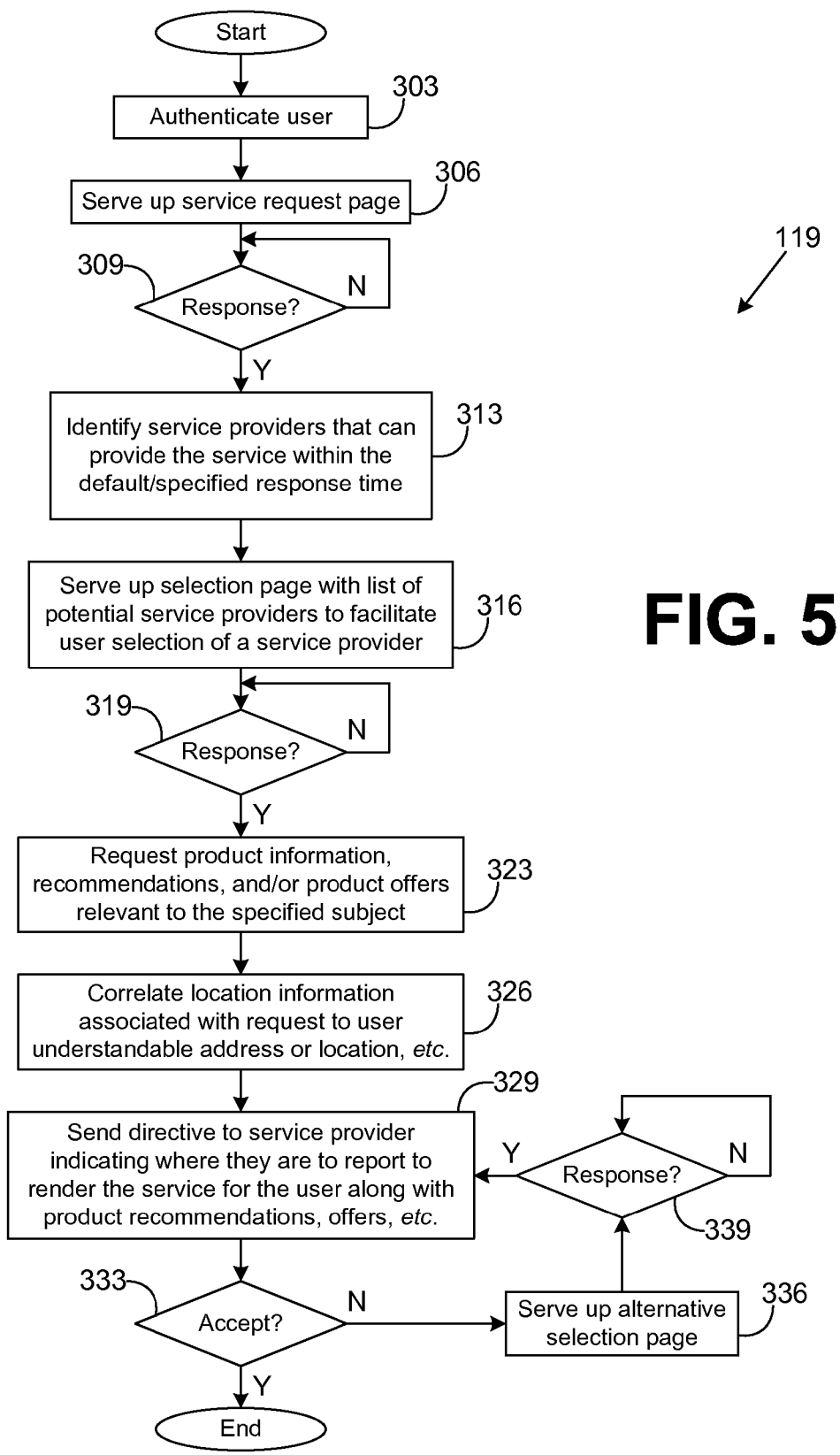
FIG. 5 is a flowchart that illustrates one example of the operation of a service broker application implemented on a server in the data communications network of FIG. 1 according to an embodiment of the present disclosure.

Referring next to FIG. 5, shown is a flowchart that provides one example of the operation of a portion of the service broker application 119 according to an embodiment of the present disclosure. Alternatively, the flowchart of FIG. 5 may be viewed as depicting steps of an example of a method implemented in the server 103 (FIG. 1). The flowchart of FIG. 5 depicts one portion of the various functionality of the service broker application 119 in generating an assignment that is ultimately given to a service provider 111 (FIG. 1) to perform a service for a user 107 (FIG. 1) based upon a request by the user 107.

To begin, in box 303, the service broker application 119 may authenticate a user 107 by serving up network pages 156 (FIG. 1) that facilitate the entry of a username and password or other authentication information as can be appreciated. Once the user 107 is authenticated, then in box 306, the service broker application 119 may serve up the network page 156 that generates, for example, the user interface 163a (FIG. 2) or other comparable user interface 163 (FIG. 1). This may facilitate the entry of the information by the user 107 indicating the service they wish to have rendered by a service provider 111 as described above. In box 309, the service broker application 119 determines whether a response has been received from the user client 106 indicating the service that the user 107 wishes to receive.

Assuming that a response is received, then in box 313, the service broker application 119 identifies service providers 111 that can provide the service within the predefined response time 183 (FIG. 1) relative to the location of the user 107 or the user client 106. To this end, the service broker application 119 may identify those service providers 111 that can reach the user 107 with the predefined response time 183 as described above. Alternatively, the service providers 111 identified may be those that are within the same geographical area bounded by specified boundaries such as zip code area, municipality, or other area as can be appreciated.

Thereafter, in box 316, the service broker application 119 serves up a network page 156, for example, that renders the user interface 163b (FIG. 3) to facilitate the selection of a service provider 111 from a list of potential service providers 111 so that the user 107 may specify the service provider 111 they wish to use for rendering the service. In box 319, the service broker application 119 waits for a proper response from the user client 106. In box 323, assuming that the user 107 has made a selection of a respective service provider 111, then the service broker application 119 requests product information such as product offerings 243 (FIG. 4) relevant to the specified subject of the service from the electronic commerce application 123 (FIG. 1).

Thereafter, in box 326, the information associated with the location of the user 107 is correlated to an address or other location that is user friendly or understandable to a person. To this end, an address or other location is identified so that the service provider 111 can find the location of the user 107. This may be the case, for example, where the user client 106 reports its location in terms of geographical coordinates that are not necessarily meaningful for a person. In this sense, the coordinates or other location information from the location aware components of the user client 106 may be converted to user friendly location information such as an address, etc.

Thereafter, in box 329, a directive is sent in the form of an email or other message format that indicates where the service provider 111 is to report to render the service to the user 107 along with any product offerings 243 or other information as described above. Next, in box 333, the service broker application 119 waits to receive an acceptance of the assignment from the service provider 111 as described above. Assuming that the service provider 111 has indicated their acceptance of the assignment, then the service broker application 119 sends a confirmation message to the user client 106 that the service provider 111 is on the way and the service broker application 119 ends as shown.

Alternatively, if the service provider 111 does not accept the assignment, then the service broker application 119 proceeds to box 336 to serve up an alternative selection page to the user 107 to allow the user 107 to select an alternative service provider 111. Thereafter, in box 339, the service broker application 119 waits to receive the response from the user 107. Then, the service broker application 119 proceeds to box 329 upon receiving an appropriate response.

In addition, it is understood that there are other functionalities associated with the service broker application 119 that are not described herein in detail. For example, the service broker application 119 may provide for payment for the services by deducting an amount from an account of the user 107. Alternatively, the user 107 may pay the service provider 111 directly or the service broker application 119 may provide for some other payment approach.

Figure 6:
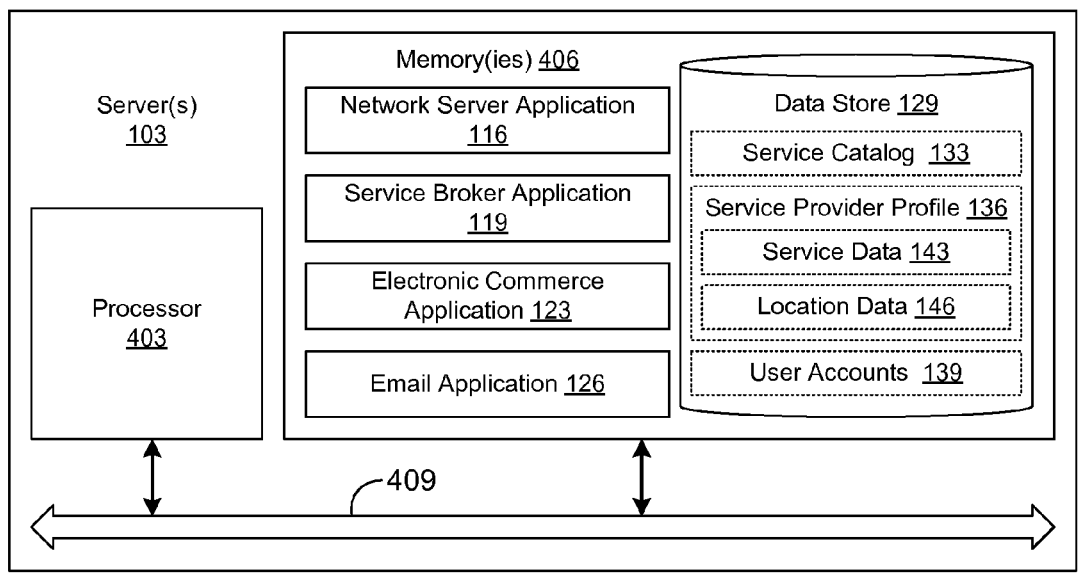
FIG. 6 is a schematic block diagram that illustrates one example of a server employed in the data communications network of FIG. 1 according to an embodiment of the present disclosure.

Referring next to FIG. 6, shown is a schematic block diagram of one example of a server 103 according to an embodiment of the present disclosure. The server 103 includes a processor circuit, for example, having a processor 403 and a memory 406, both of which are coupled to a local interface 409. To this end, the server 103 may comprise, for example, a server computer with such structure. The local interface 409 may comprise, for example, a data bus with an accompanying address/control bus or other bus structure as can be appreciated.

Stored in the memory 406 are both data and several components that are executable by the processor 403. In particular, stored in the memory 406 are the network server application 116, the service broker application 119, the electronic commerce application 123, the email application 126, and other applications not shown. In addition, a server operating system may be stored in the memory 406 and executed by the processor 403 as can be appreciated.

Also, stored in the data store 129 of the server 103 are the service catalog 133, the service provider profiles 136, the user accounts 139, and other data. The data store 129 may be stored in the memory 406 or in some other memory accessible to the server 103. It is understood that there may be other applications that are stored in the memory 406 and are executable by the processor 403 as can be appreciated. Also, other data may be stored in the memory 406 and accessed by the processor 403. Where any component discussed herein is implemented in the form of software, any one of a number of programming languages such as, for example, C, C++, Java, Java Script, Perl, Python, Flash, or other programming languages.

Figure 7:
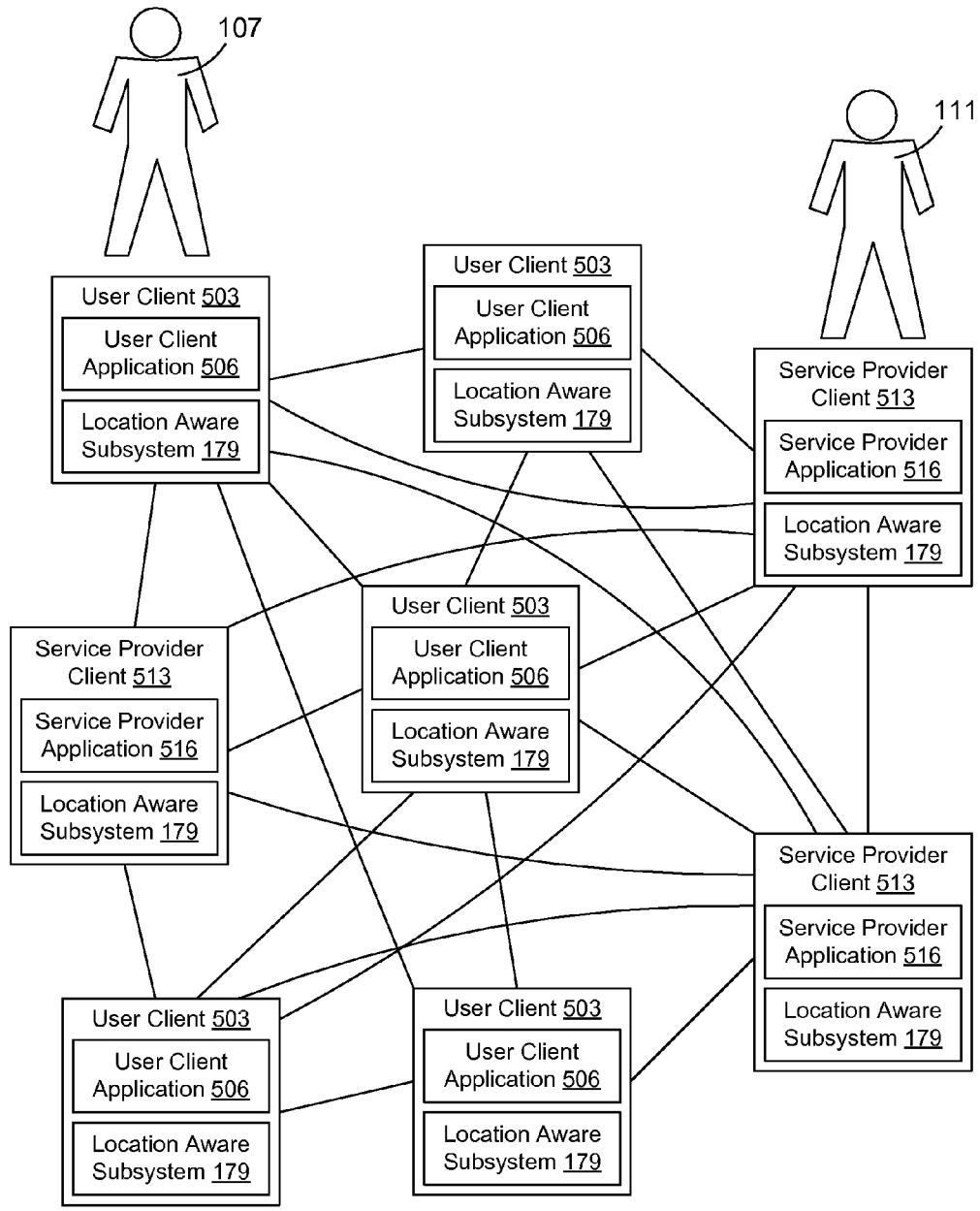
FIG. 7 is a drawing depicting an example of a peer-to-peer network according to an embodiment of the present disclosure.

With reference to FIG. 7, shown is an example of a peer-to-peer network 500 according to various embodiments. The peer-to-peer network 500 includes multiple client devices such as user clients 503, service provider clients 513, and other devices. According to one embodiment, it is possible that a single client device may act both as a user client 503 and a service provider client 513. Each of the user clients 503 and service provider clients 513 are in data communication with each other over various networks such as, for example, the Internet, intranets, extranets, wide area networks (WANs), local area networks (LANs), wired networks, wireless networks, or other suitable networks, etc., or any combination of two or more such networks. That is to say, each of the user clients 503 and service provider clients 513 may communicate with other user clients 503 and service provider clients 513 of which they are aware. To this end, the user clients 503 and service provider clients 513 that are known to a given client 503/513 in the peer-to-peer network 500 are termed herein as "known peer clients" with respect to the given client 503/513.

Due to the nature of the peer-to-peer network 500, it is possible to broadcast a message from one of the clients 503/513 to the other clients 503/513 on the peer-to-peer network 500. This is done, for example, by a given one of the clients 503/513 transmitting a message to all of its known peer clients 503/513 on the peer-to-peer network 500. From there, the message is relayed by each receiving user client 503 or service provider client 513 to its known peer clients 503/513 and so on. Ultimately, the message broadcast on the peer-to-peer network 500 by any one of the user clients 503 or service provider clients 513 will eventually propagate to all of the other relevant user clients 503 and service provider clients 513 on the peer-to-peer network 500 as can be appreciated.

According to one embodiment, the content of a given message broadcast on the peer-to-peer network 500 may only be valid for a specific period of time. Alternatively, the content of the message may be valid for only so long as a geographical position of the broadcasting one of the user clients 503 or service provider clients 513 has not substantially changed where the content includes the geographical position itself. Each of the user clients 503 and service provider clients 513 may comprise, for example, mobile devices that include a processor-based system. Such mobile devices may comprise, for example, laptops, personal digital assistants, cellular telephones, or other appropriate computing devices.

Each of the user clients 503 includes a user client application 506, a location aware subsystem 179, and possibly other applications. The user client application 506 facilitates communication with the service provider clients 513 and operates to facilitate the rendering of a service for the user 107 associated with a user client 503 by a service provider 111 associated with a respective one of the service provider clients 513. A location aware subsystem 179 generates a geographical position of the user client 503 as described above, where the geographical position is employed in various ways as will be described.

Each service provider client 513 includes a service provider application 516 that is executed in the service provider client 513 in order to interact with a user client 503 to facilitate a rendering of a service by a service provider 111 associated with the service provider client 513 on the behalf of a user 107 as will be described.

Next, a general description of the operation of the various devices on the peer-to-peer network 500 is described according to various embodiments. To begin, assume that a user 107 associated with one of the user clients 503 wishes to have a service provider 111 render a particular service. As in the example described above, assume that the user 107 wishes to receive fashion advice from a respective service provider 111 that is an expert on fashion. In order to obtain the help they desire, the user 107 may manipulate the user client application 506 to generate a request for the service of providing fashion advice.

Specifically, the user 107 may input the various information associated with a request for fashion advice into the user client 503. To facilitate the entry of such information, the user client application 506 may generate a user interface similar to the user interface 163a (FIG. 2) described above in order to input the information about the specific service sought, the geographical location of the user 107, and/or other information if deemed necessary.

Based on the information entered, according to one embodiment the user client application 506 is configured to generate a message to be broadcasted to the peer-to-peer network 500. To this end, such message is broadcasted to the peer clients 503/513 that are known to the respective user client 503 to be forwarded to other peer clients 503 and service provider clients 513 and so on as described above. The message generated by the user client application 506 to be broadcasted includes a request for the desired service based upon the information entered by the user 107 and a geographical position of the user client 503. The geographical position of the user client 503 is included in the message so that subsequent clients 503/513 can decide whether the user 107 is close enough to warrant forwarding the message to its known peer clients 503/513 on the peer-to-peer network 500. To this end, according to one embodiment, the broadcast of the message may be limited to a general geographical area relative to the respective user 107.

Assuming that a respective service provider client 513 receives the message transmitted by a user client 503, the service provider application 516 determines whether the service provider 111 associated with the service provider client 513 is capable of performing the requested service indicated in the message. To this end, a service provider 111 may configure the service provider application 516 indicating which services the service provider 111 can render. Assuming that the service provider 111 renders the requested service, then the service provider application 516 is configured to present the request from the user 107 for the service on a display device of the service provider client 513.

If the service provider 111 is willing to take on the assignment of rendering the service for the user 107, then the service provider 111 may indicate their willingness by manipulating various input components. To this end, the service provider application 516 may generate a user interface similar to the user interface 173a (FIG. 4) that may be manipulated by the service provider 111 as can be appreciated. Thereafter, service provider application 516 sends a reply to the request for the service from the respective user client 503 indicating that the service provider 111 is willing to perform the service. Included in the reply is various information such as, for example, the geographical location of the service provider 111, a mode of transportation employed by the service provider 111 to reach the user 107, vital statistics about the service provider 111 such as their name, experience level and other personal information, and any other information deemed necessary.

Upon receiving the reply from the respective service provider client 513, the user client application 506 proceeds to calculate the time that it would take for the respective service provider 111 to reach the user 107 and render the respective service. For example, if the user 107 was located in a shopping mall and requested fashion advice from a respective service provider 111, the estimated time calculated is the time it would take for the service provider 111 to travel from their current position to the shopping mall to render the respective service. According to one embodiment, a maximum time threshold may be specified by a user 107 such that all responses from service providers 111 that take longer than such time threshold may be ignored.

Ultimately, the user client application 506 proceeds to generate a listing of available service providers 111 to be displayed to the user 107 on the user client 503 contemporaneously with the broadcasting of the message described above.

The listing sets forth the one or more service providers 111 that responded to the request for the service and that are capable of rendering the service for the user 107. The user client application 506 facilitates a selection of one of these service providers 111 to perform the service. To this end, the user client application 506 may generate a user interface such as the user interface 163b (FIG. 3) that lists the various potential service providers 111 as well as the time that each would take to respond to the request.

The list is displayed contemporaneously with the sending or broadcast of the message by the user client 503 in that the user 107 is made aware of the potential service providers 111 that could render the requested service within a short period of time after sending the request. Thus, the user 107 is contemporaneously made aware of service providers 111 that could render the respective service at the time the service is needed.

The user 107 may then select a respective one of the service providers 111 listed as described above. Thereafter, the user client application 506 sends a reply to the respective service provider client 503 informing the respective service provider 111 that they have been selected to perform the service. In response, the service provider application 516 may generate a user interface similar to the user interface 173a to inform the service provider 111 that they have been selected to perform the service. Assuming that the service provider 111 indicates an acceptance of the assignment to perform the service, then the service provider application 516 may send an appropriate reply to the user client application 506 informing the user 107 that the service provider 111 has accepted the assignment and is on the way to render the service.

In determining the response time for a respective service provider 111, the user client application 506 may take into account the information in the response from the service provider client 513. Such information may include the geographical position of the service provider 111 and a mode of transportation associated with the service provider 111. From this information, a distance may be determined between the user 107 and the service provider 111. Given the mode of transportation of the service provider 111, an estimate of the time it would take for the service provider 111 to reach the user 107 may be calculated as can be appreciated.

To this end, different modes of transportation may include, for example, travel by car, bicycle, on foot, or other mode of transportation. Given an average speed of such modes of transportation and the distance between the service provider 111 and the user 107, a general estimate of the time it takes for the service provider 111 to reach the user 107 to render the service may be calculated.

As described above, the user client application 506 broadcasts a request for a service on the peer-to-peer network 500. As an alternative to this approach, the service provider application 516 may be configured to broadcast messages indicating the services that can be provided by the respective service provider 111. Also, the current geographical location of the service provider client 513 held by a service provider 111 and the transportation mode associated with the service provider 111 may also be included in the broadcast messages.

Such messages may propagate on the peer-to-peer network 500 in a manner similar to that described above. Upon receiving a message from a respective service provider client 513, each of the user clients 503 stores the services offered by the service provider 111 and the current geographical location of the service provider 111 in a memory of the user client 503 as will be described. In addition, other information included in the message from the service provider client 513 may be recorded such as, for example, the name of the service provider 111, and any other information about the service provider 111 that may be deemed important or necessary.

The service provider application 516 may periodically broadcast the message to the peer-to-peer network 500 according to a predefined schedule, or the same may broadcast the message when a substantial change in the geographical position of the service provider client 513 has occurred. This may be done to minimize the amount of data traffic created by the broadcasting of the service capabilities of a respective service provider 111. In the case of transmitting upon a substantial change in the geographical position of the service provider client 513, the data traffic may be substantially reduced when a service provider 111 remains in various locations for extended periods of time. A substantial change in this sense may be defined as a change in position that is greater than a predefined distance threshold.

Thus, the service provider 111 transmits the message that includes its geographical position, mode of transportation, and other information in a manner that ensures that the respective user clients 503 are made aware of the current status of the service provider 111 in terms of their location, mode of transportation, and other appropriate data.

Assuming that a given user 107 requires a given service from a service provider 111, the user 107 may enter the desired service to be performed into the user client application 506 via an appropriate user interface such as the user interface 163a. The user client application 506 may then determine whether it currently stores a record of any service provider 111 that can provide the requested service.

Based on the information stored in the user client 503, the user client application 506 may identify the one or more service providers 111 that can perform the requested service. To make such determination, the user client application 506 may calculate those service providers 111 that can render the desired service within a predefined response time as described above. Once the user client application 506 has identified one or more service providers 111 that can render the desired service and has calculated appropriate response times, the user client application 506 will present a list of such service providers 111 with their response times and other information to the user 107 on a display device, for example, as can be appreciated. To this end, the user client application 506 may generate a user interface such as the user interface 163b as described above. The user 107 may then select a respective one of the service providers 111 to provide the desired service.

Upon selection of a respective one of the service providers 111, the user client application 506 causes a message to be transmitted to the respective service provider client 513 of the selected service provider 111 indicating that the service provider 111 has been selected to render the service. To this end, the service provider application 516 may generate a user interface that is similar to the user interface 173a as can be appreciated. The service provider 111 may then indicate their willingness to perform the respective service by manipulating various input components of the service provider application 516. Assuming the service provider 111 accepts the assignment, the service provider application 516 is configured to send a confirmation to the respective user client 503 indicating that the service provider 111 will render the service. Upon receiving the confirmation, the user 107 may then wait for the service provider 111 to meet up with them to perform the respective service.

To this end, in any of the approaches described above, a user 107 receives a service from a service provider 111 contemporaneously with the time when the need for the service arises. Thus, there is no need to schedule such services for some time in the future as can be appreciated. In this sense, services are rendered on demand.

Figure 8:
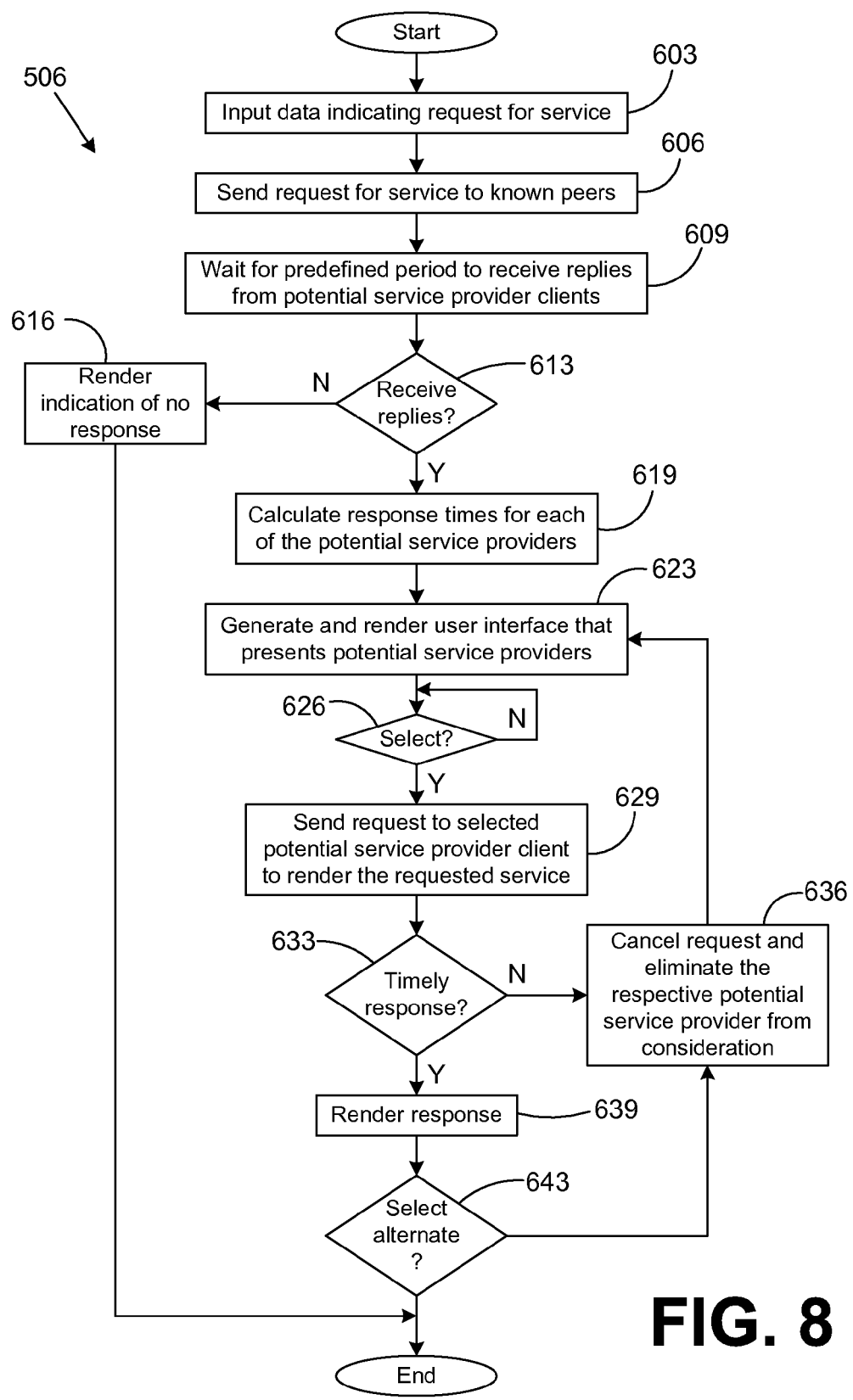
FIG. 8 is a flowchart that depicts one example of the operation of a user client application implemented in a user client in the peer-to-peer network of FIG. 7 according to an embodiment of the present disclosure.

Referring next to FIG. 8, shown is a flowchart that provides one example of the operation of one embodiment of the user client application 506 according to an embodiment of the present disclosure. Alternatively, the flowchart of FIG. 8 may be viewed as depicting steps of an example of a method implemented in a user client 503 (FIG. 7) according to various embodiments. The flowchart of FIG. 8 depicts the functionality associated with the user client application 506 in the first one of the scenarios described above in which the user client application 506 generates the message that is broadcast on the peer-to-peer network 500 (FIG. 7) requesting the service from service providers 111 (FIG. 1).

Beginning in box 603, the user client application 506 inputs data indicating a request for a respective service. To this end, the user client application 506 may generate one or more user interfaces such as the user interface 163a (FIG. 2) as described above. Thereafter, in box 606, the user client application 506 sends the request for service in the form of a message to the peer clients 503/513 (FIG. 7) that are known to the respective user client 503.

In doing so, the user client 503 broadcasts the message to all peer clients 503/513 in the peer-to-peer network 500 that are within a given range of the respective user client 503. To this end, the message itself includes the request for the respective service, the geographical location of the respective user client 503, and any other information such as, for example, a desired response time within which the service provider 111 should be able to render the service, or other information. The geographical location of the respective user client 503 or other data may be examined by clients 503/513 to determine whether they will forward the message to further clients 503/513 when such clients 503/513 may be too far away for the associated service providers 111 to render the service. To this end, the propagation of the message on the peer-to-peer network 500 may be limited geographically or in some other manner.

In box 609, the user client application 506 waits for a predefined period of time to receive replies from service provider clients 513 of potential service providers 111. Then, in box 613, the user client application 506 determines whether it has received any replies from respective service provider clients 513. If not, then the user client application 506 proceeds to box 616 to render an indication that there were no responses, and accordingly, there are no service providers 111 available to render the respective service. Thereafter, the user client application 506 ends as shown.

However, if replies have been received as determined in box 613, then in box 619, the response times for each of the potential service providers 111 are calculated based upon the distance between the respective user 107 (FIG. 1) and the respective service providers 111, and based upon the respective modes of transportation associated with the service providers 111. To this end, each reply from a respective service provider 111 includes the geographical position of the service provider 111 and the mode of transportation as described above.

Then, in box 623, a user interface is generated and rendered such as the user interface 163a (FIG. 2) that presents the potential service providers 111 to the user 107. Associated with each listed service provider 111 is the indication of the response time for the respective service provider and any other pertinent information.

To this end, the user interface may also depict a service rating associated with the respective service providers 111. The service rating may indicate the quality of the performance of the respective service provider 111. Such a rating may be obtained from a central server that calculates and stores such information, or a rating may be generated based upon feedback that is transmitted onto the peer-to-peer network 500 by each of the user client applications 506 of respective user clients 503. To this end, each user client application 506 is further configured to store and calculate a rating of respective service providers 111 based upon the ratings received from other user clients 503 over time. The ratings stored and calculated may be restricted to the service providers 111 that are actually employed by a given user 107 from time to time.

In box 626, the user client application 506 determines whether the user 107 has selected a given one of the service providers 111 to perform the service. If so, then in box 629, the user client application 506 sends a request to the service provider client 513 of the selected one of the service providers 111 to render the requested service. In box 633, the user client application 506 determines whether a timely response to the request is received. If not, the user client application 506 proceeds to box 636 in which the prior sent request is canceled and the respective potential service provider 111 is eliminated from future consideration for performing the respective service. To cancel the request, a message may be sent to the service provider client 513 to inform the service provider 111 that the request has been canceled. Thereafter, the user client application 506 reverts back to box 623 to generate and render a subsequent user interface to present a subsequent selection of service providers 111 as described above.

Assuming that a timely response was received in box 633, then in box 639, the user client application 506 renders the response for the user 107 on a display device of the respective user client 503 to inform them whether the service provider 111 is willing to provide the desired service. In box 643, the user client application 506 determines whether an alternate service provider 111 needs to be selected. This may be the case, for example, if the service provider 111 identified previously has declined to render the service to the respective user 107. If a new service provider 111 is to be selected, then the user client application 506 reverts back to box 636 as described above. Otherwise, the user client application 506 ends as the service provider 111 is presumably on the way to meet the user 107 to render the desired service.

Figure 9:
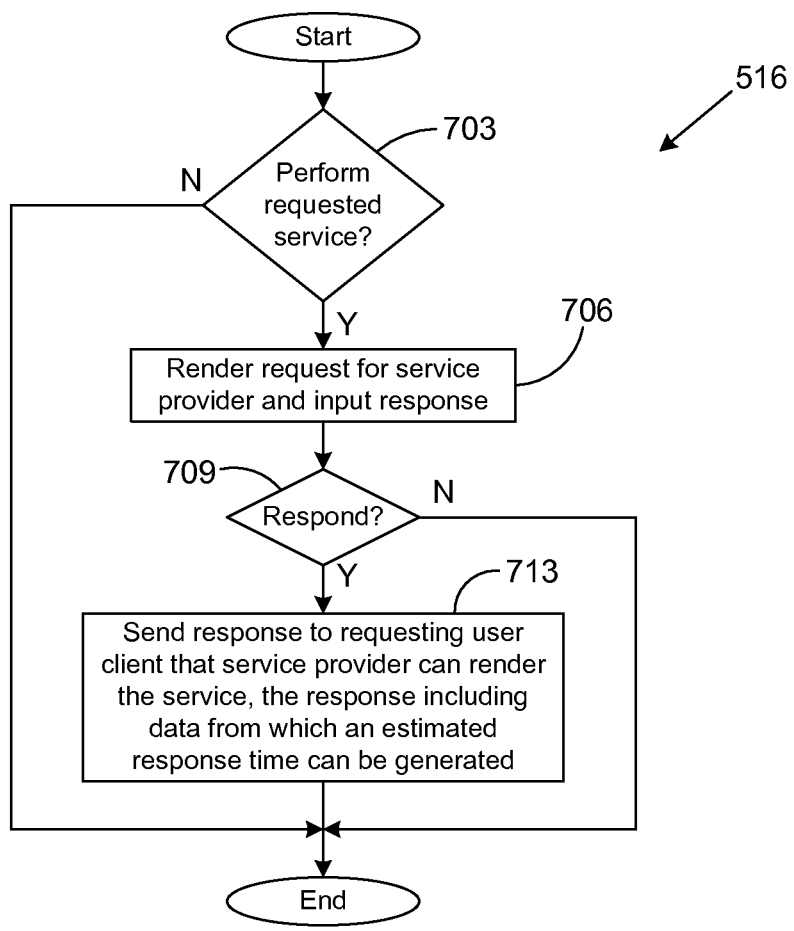
FIG. 9 is a flowchart that depicts one example of the operation of a service provider application implemented in a service provider client in the peer-to-peer network of FIG. 7 according to an embodiment of the present disclosure.

Referring next to FIG. 9, shown is a flowchart that provides one example of the operation of the service provider client 513 (FIG. 7) according to an embodiment of the present disclosure. Alternatively, the flowchart of FIG. 9 may be viewed as depicting steps of an example of a method implemented in a service provider client 513. The flowchart of FIG. 9 generally describes the operation of one example of the service provider application 516 in the situation where the user client application 506 (FIG. 7) broadcasts requests for services on the peer-to-peer network 500 (FIG. 7) as described above.

Beginning with box 703, upon receipt of a request from a user client 503 to perform a service, the service provider application 516 determines whether the respective service provider 111 (FIG. 1) actually performs the service requested. If not, the service provider application 516 ends as shown.

On the other hand, if the service provider 111 does perform the requested service, then in box 706, the service provider application 516 renders the request on a display device of the service provider client 513 or other output device to solicit a response from the service provider 111 as to whether they are willing to perform the service. To this end, the user interface may be similar to the user interface 173a (FIG. 4) described above.

In box 709, if the service provider 111 responds that they wish to perform the service for the client 107 (FIG. 1), then the service provider application 516 proceeds to box 713. Otherwise, the service provider application 516 ends as shown.

In box 713, the service provider application 516 sends a response to the respective user client 503 that the service provider 111 can render the service. The response may include various data from which an estimated response time can be calculated by the user client application 506. Such data may comprise, for example, a geographical location of the service provider 111 and a mode of transportation employed by the service provider 111 as described above. Alternatively, the service provider application 516 may calculate the estimated response time itself that is included in the response.

Thereafter, the service provider application 516 ends as shown. Note that the service provider application 516 may receive a subsequent message from the requesting user client 503 confirming that the respective service provider 111 has been selected to perform the service. In such case, the service provider application 516 may render an appropriate user interface that directs the service provider 111 to proceed to the location of the user 107 to render the service as described above.

Figure 10:
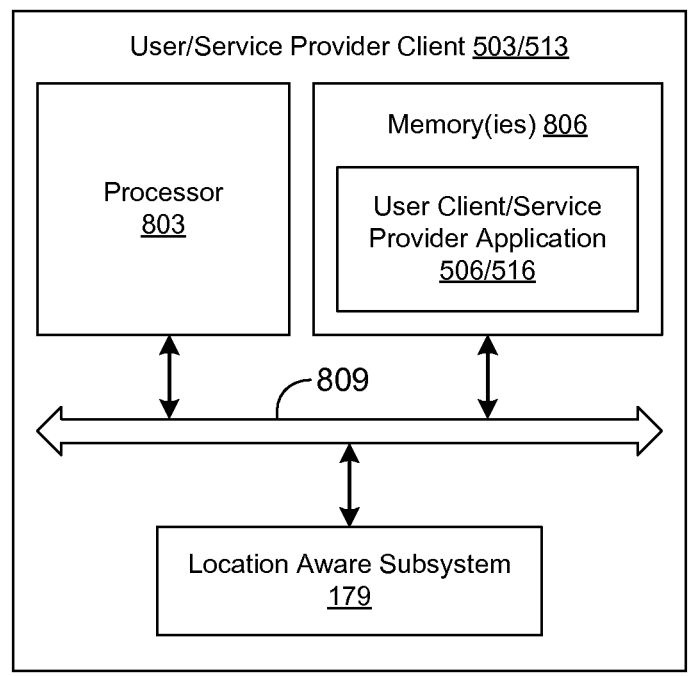
FIG. 10 is a schematic block diagram that illustrates one example of a client employed in the peer-to-peer network of FIG. 7 according to an embodiment of the present disclosure.

Referring next to FIG. 10, shown is a schematic block diagram of one example of a user client 503 or a service provider client 513 according to an embodiment of the present disclosure. The client 503/513 includes a processor circuit, for example, having a processor 803 and a memory 806, both of which are coupled to a local interface 809. To this end, the client 503/513 may comprise, for example, a mobile computer system or like system. The local interface 809 may comprise, for example, a data bus with an accompanying address/control bus or other bus structure as can be appreciated.

Stored in the memory 806 are both data and several components that are executable by the processor 803. In particular, stored in the memory 806 are the user client application 506 or the service provider application 516, and possibly other applications not shown. In addition, an appropriate operating system may be stored in the memory 806 and executed by the processor 803 as can be appreciated.

Also, various data may be stored in the memory 806 or in some other memory accessible to the server 103 that is employed by the user client application 506 or the service provider application 516. It is understood that there may be other applications that are stored in the memory 806 and are executable by the processor 803 as can be appreciated. Also, other data may be stored in the memory 806 and accessed by the processor 803. Where any component discussed herein is implemented in the form of software, any one of a number of programming languages such as, for example, C, C++, Java, Java Script, Perl, Python, Flash, or other programming languages.

A number of software components are stored in one of the memories 406/806 and are executable by a respective processor 403/803 as described above. In this respect, the term "executable" as contemplated herein refers to a program file, for example, that is in a form that can ultimately be run by a respective processor 403/803. Examples of executable programs may be, for example, a compiled program that can be translated into machine code in a format that can be loaded into a random access portion of one of the memories 406/806 and run by a respective processor 403/803, or source code that may be expressed in proper format such as object code that is capable of being loaded into a random access portion of a memory 406/806 and executed by a respective processor 403/803, etc. An executable program may be stored in any portion or component of a respective memory 406/806 including, for example, random access memory, read-only memory, a hard drive, compact disk (CD), floppy disk, or other memory components.

Each of the memories 406/806 is defined herein as both volatile and nonvolatile memory and data storage components. Volatile components are those that do not retain data values upon loss of power. Nonvolatile components are those that retain data upon a loss of power. Thus, each of the memories 406/806 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components executed on the server 103 or clients 503/513 as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowcharts of FIGS. 5, 8, and 9 show the functionality and operation of at least a portion of the service broker application 119, the user client application 506, or the service provider application 516 according to one embodiment. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 5, 8, or 9 show a specific order of execution, it is understood that the order of execution may differ from that which is depicted. For example, the order of execution of two or more blocks may be scrambled relative to the order shown. Also, two or more blocks shown in succession in FIG. 5, 8, or 9 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the service broker application 119, the user client application 506, the service provider application 516, and/or any other component implemented in the server 103 or the clients 503/513 as described above comprise software or code, the same can be embodied in any computer-readable medium for use by or in connection with an instruction execution system such as, for example, a processor in a computer system or other system. In this sense, the service broker application 119, the user client application 506, the service provider application 516, and/or other component may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   maintaining location data in at least one server, the location data representing a current location of individual ones of a plurality of service providers;
   periodically updating, via the at least one server, the current location of the individual ones of the plurality of service providers in the at least one server by facilitating interaction between an application in the at least one server and a plurality of service provider clients to obtain a location of individual ones of the plurality of service provider clients;
   associating, via the at least one server, the individual ones of the plurality of service providers with at least one of a plurality of services;
   authenticating, via the at least one server, a user;
   receiving, via the at least one server, a current location of the user in response to authenticating the user;
   prompting, from the at least one server, the user to request a service;
   in response to receiving a request from the user for the service, identifying, via the at least one server, a subset of the plurality of service providers for which the current location of individual ones of the subset of the plurality of service providers results in a service response time to the current location of the user that is within a predefined limit, wherein the service response time is calculated based upon a distance between the individual ones of the subset of the plurality of service providers and the user, and a mode of transportation associated with the individual ones of the subset of the plurality of service providers; and sending a listing of the subset of the plurality of service providers from the at least one server to the user, responsive to a receipt of the request, to facilitate a selection of one of the plurality of service providers to render the service, wherein the listing of the subset of the plurality of service providers comprises a geographical location of the individual ones of the subset of the plurality of service providers, the mode of transportation associated with the individual ones of the subset of the plurality of service providers, and information about the individual ones of the subset of the plurality of service providers, wherein the information comprises a name and rating of the individual ones of the subset of the plurality of service providers.

2. The method of claim 1, further comprising:

establishing a new one of the plurality of service providers in the at least one server; and sending another application to a new service provider client associated with the new one of the plurality of service providers to install on the new service provider client, the another application facilitating the interaction between the new service provider client and the application in the at least one server to inform the at least one server of a location of the new service provider client.

3. The method of claim 1, further comprising:

sending a directive, from the at least one server to a respective one of the plurality of service provider clients associated with the selected one of the plurality of service providers, directing the selected one of the service providers to render the service to the user in response to a receipt of the selection of the one of the plurality of service providers to render the service;

generating a product offering in the at least one server, the product offering associated with the service; and including the product offering with the directive to the respective one of the plurality of service provider clients.

4. A method, comprising:

maintaining location data in at least one server, the location data representing a current location of individual ones of a plurality of service providers;

periodically updating, via the at least one server, the current location of the individual ones of the plurality of service providers by facilitating interaction between an application in the at least one server and a service provider client to obtain a current location of the service provider client;

authenticating, via the at least one server, a user;

receiving, via the at least one server, a current location of the user in response to authenticating the user;

prompting, via the at least one server, the user to request a service;

in response to receiving a request from the user for the service, identifying, via the at least one server, a subset of the plurality of service providers for which the current location of individual ones of the subset of the plurality of service providers results in a respective service response time to the current location of the user that is within a predefined limit, wherein the service response time is calculated based at least in part upon a distance between the individual ones of the subset of the plurality of service providers and the user, and a mode of transportation associated with the individual ones of the subset of plurality of service providers; and sending a listing of the subset of the plurality of service providers from the at least one server to the user in response to a receipt of the request for the service to facilitate a selection of one of the subset of the plurality of service providers to render the service, the listing including a geographical location for the individual ones of the subset of the plurality of service providers, the mode of transportation associated with the individual ones of the subset of the plurality of service providers, and information about the individual ones of the subset of the plurality of service providers, the information comprising a name and a rating of the individual ones of the subset of the plurality of service providers.

5. The method of claim 4, further comprising: determining, in the at least one server, an availability of individual service providers in the subset of the plurality of service providers based upon a schedule for the individual service providers.

6. The method of claim 4, wherein the service comprises one of a plurality of services maintained in the server, the method further comprising associating individual ones of the plurality of service providers with at least one of the services.

7. The method of claim 4, further comprising:

establishing a new one of the plurality of service providers in the at least one server; and sending an application to the service provider client associated with the new one of the plurality of service providers to install on the service provider client, the application facilitating interaction between the service provider client and the at least one server to inform the at least one server of the current location of the service provider client.

8. The method of claim 4, further comprising:

in response to a receipt of the selection of one of the service providers to render the service, sending a directive from the at least one server to the service provider client that is associated with the selected service provider, the directive directing the selected service provider to render the service to the user;

generating a product offering in the at least one server, the product offering associated with the service; and including the product offering with the directive to the service provider client.

9. A system, comprising:

at least one server;

location data stored in a data store accessible to the at least one server comprising a current location for individual ones of a plurality of service providers;

service data stored in the data store accessible to the at least one server, wherein the service data includes a plurality of services; and an application executable in the at least one server, the application comprising:

logic that periodically updates the current location of the individual ones of the plurality of service providers in the at least one server by interacting with individual ones of a plurality of service provider clients associated with corresponding individual ones of the plurality of service providers to obtain a current location of the individual ones of the plurality of service provider clients;

logic that authenticates a user;

logic that identifies a current location of the user in response to an authentication of the user;

logic that identifies a subset of the plurality of service providers in the data store in response to a service request from a client associated with the user, the plurality of service providers in the subset being those with a service response time relative to the current location of the user that is within a predefined limit, wherein the service response time is calculated based upon a distance between a service provider in the subset of the plurality of service providers and the user, and a mode of transportation associated with the service provider in the subset of the plurality of service providers; and logic that sends a listing of the subset of the plurality of service providers from the at least one server to the client contemporaneously with a receipt of the service request to facilitate a selection of one of the plurality of service providers to render the service, the listing including a geographical location of individual ones of the subset of the plurality of service providers, the mode of transportation associated with the individual ones of the subset of the plurality of service providers, and information about the individual ones of the subset of the plurality of service providers, wherein the information comprises a name and a rating of the individual ones of the plurality of service providers.

10. The system of claim 9, wherein individual ones of the plurality of services are associated with the individual ones of the plurality of service providers.

11. The system of claim 9, wherein the application further comprises:

logic that establishes a new one of the plurality of service providers; and logic that sends a client application to a service provider client associated with the new one of the plurality of service providers to install on the service provider client, the client application facilitating a interaction between the service provider client and the application to inform the application of a location of the service provider client.

12. The system of claim 9, wherein the application further comprises:

logic that receives the selection of one of the subset of the plurality of service providers to render the service;

logic that, in response to receipt of the selection, sends a directive to one of the service provider that is associated with the selected one of the subset of the plurality of service providers, the directive directing the selected one of the subset of the plurality of service providers to render one of the plurality of services to the user;

logic that generates a product offering associated with the one of the plurality of services; and logic that includes the product offering with the directive to the one of the service provider clients.

13. A method, comprising:

storing location data in a data store accessible to at least one server comprising, the location data comprising a current location for individual ones of a plurality of service providers;

periodically updating, in the at least one server, the current location of the individual ones of the plurality of service providers by interacting with individual ones of the plurality of service provider clients associated with corresponding individual ones of the plurality of service providers to obtain a current location of the individual ones of the plurality of service provider clients;

determining, on a client, whether a user is authorized to request a service;

identifying, by the at least one server, a current location of the user in response to an authentication of the user;

prompting, on a display of the client, for a request for the service;

processing the request inputted into the client for the service to be performed at a geographical position of the user;

broadcasting a message from the client to a plurality of known peer clients on a peer-to-peer network, the message including the request for the service and the geographical position of the user;

determining a service response time for at least one service provider willing to perform the requested service, the determination based at least in part on a geographical location of the at least one service provider relative to the geographical position of the user where the service response time is calculated based upon a distance between the at least one service provider and the user, and a mode of transportation associated with the at least one service provider; and presenting a listing on the display of the client contemporaneously with broadcasting the message to facilitate a selection of the at least one service provider to perform the service, the listing setting forth a subset of the plurality of service providers, if the service response time is within a predefined limit, and including a geographical location of the at least one service provider, the mode of transportation associated with the at least one service provider, and information about the at least one service provider that comprises a name and a rating of the at least one service provider.

14. The method of claim 13, further comprising sending a second message to a selected service provider confirming that the selected service provider is to perform the service.

15. The method of claim 13, wherein the client comprises a first client, and further comprising determining whether a second message received from a second client is to be passed on to the plurality of known peer clients on the peer-to-peer network.

16. The method of claim 15, where the determination as to whether the second message is to be passed on to the plurality of known peer clients is made depending upon a distance between the first client and the second client.

17. The method of claim 4, wherein the service response time is further calculated based at least in part on at least one characteristic of at least one route between the service provider and the user.

18. The method of claim 4, wherein the service response time is further calculated based at least in part on at least one traffic characteristic of at least one route between the service provider and the user.

19. The system of claim 9, wherein the service response time is further calculated based at least in part on at least one characteristic of at least one route between a service provider in the subset of the plurality of service providers and the user.

20. The system of claim 9, wherein the service response time is further calculated based at least in part on at least one traffic characteristic of at least one route between a service provider in the subset of the plurality of service providers and the user.

21. The method of claim 1, wherein the service response time is further calculated based at least in part on at least one traffic characteristic of at least one route between the individual ones of the subset of the plurality of service providers and the user.

22. The method of claim 1, the service response time is further calculated based at least in part on at least one characteristic of at least one route between the individual ones of the subset of the plurality of service providers and the user.

* * * * *